United States Patent
Garney (10) Patent No.: US 8,146,089 B2
(45) Date of Patent: Mar. 27, 2012

(54) SHARING RESOURCES OF A PARTITIONED SYSTEM

(75) Inventor: John I. Garney, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1411 days.

(21) Appl. No.: 11/452,756

(22) Filed: Jun. 14, 2006

(65) Prior Publication Data

US 2007/0294689 A1 Dec. 20, 2007

(51) Int. Cl.
G06F 9/46 (2006.01)

(52) U.S. Cl. ...................................... 718/104

(58) Field of Classification Search .................... 718/104
See application file for complete search history.

(56) References Cited

U.S. PATENT DOCUMENTS

| | | | | |
|---|---|---|---|---|
| 6,247,109 B1* | 6/2001 | Kleinsorge et al. | ............. | 712/13 |
| 6,986,137 B1* | 1/2006 | King et al. | .................... | 718/104 |
| 2002/0016892 A1* | 2/2002 | Zalewski et al. | ............... | 711/153 |
| 2002/0052914 A1* | 5/2002 | Zalewski et al. | ............... | 709/203 |
| 2002/0116436 A1* | 8/2002 | Whitton | ......................... | 709/100 |
| 2005/0114610 A1* | 5/2005 | Robinson et al. | ............. | 711/152 |
| 2005/0210470 A1* | 9/2005 | Chung et al. | .................. | 718/100 |

OTHER PUBLICATIONS

U.S. Appl. No. 11/396,126, Filed Mar. 31, 2006, entitled "Methods and Apparatus To Optimize Bios For A Partitioned Platform" by John I. Garney.

* cited by examiner

*Primary Examiner* — Meng An
*Assistant Examiner* — Blake Kumabe
(74) *Attorney, Agent, or Firm* — Trop, Pruner & Hu, P.C.

(57) ABSTRACT

In one embodiment, the present invention includes a method for allocating at least one dedicated core and at least one shareable core to a first partition of a system, where the cores are owned by the first partition. During operation, the shareable core(s) may be made dynamically available for use in one or more other partitions of the system, while the first partition retains ownership of the shared core(s). Other embodiments are described and claimed.

14 Claims, 5 Drawing Sheets

SHARING RESOURCES OF A PARTITIONED SYSTEM

BACKGROUND

Embodiments of the present invention relate to processor-based systems, and more particularly to partitioned systems.

As computer systems become more complex and provide for greater processing capabilities, many systems are implemented in a partitioned fashion. That is, resources of the system are dedicated to separate partitions, where they are isolated from other partitions. Each partition may operate in its own context using various resources such as processors, memory, input/output (I/O) devices and the like. Furthermore, a dedicated operating system (OS) may be present in each partition.

Different types of partitioned systems exist. Certain systems are referred to hard partitioned systems, where hardware is replicated across the different partitions such that each partition includes its own independent hardware to independently perform tasks. Examples of such hard partitioned systems are various server-based systems for performing network processing functions, among other such activities. Other systems are so-called soft partitioned systems, where a single set of hardware exists that is controlled by centralized software such as a virtual machine monitor (VMM). The VMM owns the various hardware resources. In turn, multiple virtual machines (VM's) may operate as independent logical systems that believe they have full access to the underlying hardware, while in fact the VMM provides time-multiplexed or simulated access to the hardware by the different VMs.

In any of these partitioning paradigms, the actual hardware resources are owned by a single entity (e.g., a hard partition or centralized software such as an OS or VMM). As a result, the resources are dedicated to their owner and in cases where the resources are not fully utilized by their owner, underutilization can occur which can negatively affect performance of other partitions that are fully consuming their resources, as well as the overall system.

DETAILED DESCRIPTION

In various embodiments, central processing unit (CPU) cores of a partitioned platform may be identified into one of multiple classes of cores. Some cores may be classified as dedicated cores that are dedicated to a given partition of the platform. Other cores may be classified as shareable or leasable cores in that, although the core is owned by a given partition, the owning partition may temporarily allow the core to be used by another partition (i.e., a leasing partition) although the owning partition retains ownership of the core. Accordingly, while such shareable cores may be used amongst multiple partitions, the owning partition retains total independent ownership of the core. Thus the granting of use of the core by other partitions occurs under the control of the owning partition, which can allocate the core for other use and instruct return of the core to the owning partition on demand. At any time a core is being used by a single partition, the state of that core is solely controlled by that partition. As will be described further below, embodiments enable an owning partition to allow other partitions to use one or more of its cores, while still ensuring that the state of that core is not visible outside of the currently using partition.

As will be described further below, a partitioned platform may include multiple partitions each having its own operating system (OS), along with various resources owned by the partition such as processor cores, memory, input/output (I/O) devices and the like. Furthermore, each partition may include one or more interfaces to enable sharing usage of cores among the partitions. In some embodiments, one distinguished partition may act as a management partition to enable a transfer of cores according to predetermined sharing relationships established in the management partition. While described herein with respect to sharing of cores, it is to be understood that the scope of the present invention is not limited in this regard and in various implementations other hardware resources such as other processing engines, memory, peripheral devices and the like also may be shared among partitions.

Using embodiments of the present invention, one or more shareable cores may be dynamically allocated to one or more partitions for temporary use, while the shareable core(s) is still owned by its owning partition. More so, the dynamic allocation may be performed in a decentralized manner, as the shareable core is owned by a given partition, rather than a centralized resource. In this way, the partitioning of cores of the underlying platform is not a pure hardware or software based partitioning.

In some implementations, relationships between various partitions may be pre-arranged to allow for dynamic allocation of shareable resources. More specifically, in some embodiments a so-called "contract" between partitions may be arranged so that shareable cores or other resources can be shared efficiently when availability for such sharing is enabled by an owning partition. This contract may be asymmetric in nature, as the owning partition retains total control over the shareable resource. Thus, while a contract between cores may be arranged such that a leasing partition can obtain use, at least temporarily, of the shareable resource, the owning partition can inform the leasing partition that its use of the shareable resource has been rescinded on demand.

Figure 1:
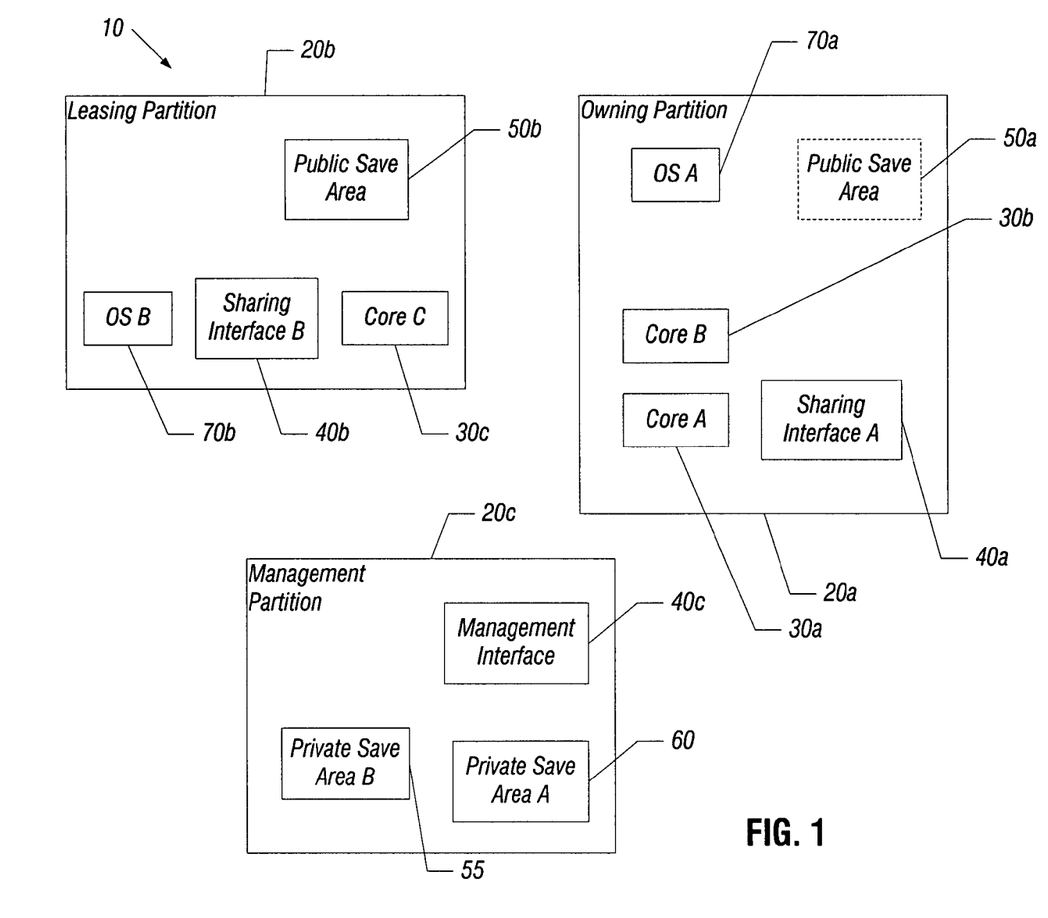
FIG. 1 is a block diagram of a portion of a system in accordance with one embodiment of the present invention.

Referring now to FIG. 1, shown is a block diagram of a portion of a system in accordance with one embodiment of the present invention. As shown in FIG. 1, system 10 may be a partitioned platform that includes a plurality of partitions 20a-20c (generically partition 20). While shown with three such partitions in the embodiment of FIG. 1, it is to be understood that the scope of the present invention is not limited in this regard and in many implementations more than three such partitions may be present.

Still referring to FIG. 1, first partition 20a may be an owning partition that owns at least one core that can be shared (i.e., usable) by another partition. Specifically, as shown in FIG. 1, first partition 20a includes a first core 30a and a second core 30b (generically core 30). Second core 30b may be a dedicated core owned by first partition 20a and usable only by the first partition. However, first core 30a may be a shareable core such that this resource can be used by another partition in system 10, e.g., a second partition 20b. To enable sharing of resources such as cores, a sharing interface 40a may be associated with shareable core 30a in owning partition 20a. Note that in some embodiments, a sharing interface may be associated with each shareable core of a partition. As will be discussed further below, first partition 20a further includes a public save area 50a. Furthermore, first partition 20a includes a first OS 70a. First OS 70a may be any desired operating system to enable execution of applications and other processes on first partition 20a. While first OS 70a may control execution of many activities on first partition 20a, in various implementations resource sharing between partitions may be effected in a decentralized manner and without substantial involvement from first OS 70a, as discussed further below. While shown with only these minimum components for ease of illustration in the embodiment of FIG. 1, it is to be understood that the scope of the present invention is not limited in this regard and a partition may include many other components including additional cores, I/O devices, other hardware resources and the like.

Still referring to FIG. 1, second partition 20b may correspond to a leasing partition that may use shareable resources of another partition, e.g., first partition 20a. While able to use, at least temporarily, such resources, these resources remain owned by the owning partition, e.g., first partition 20a. As shown in FIG. 1, second partition 20b includes a core 30c, which may be a dedicated core for second partition 20b. Furthermore, second partition 20b includes a sharing interface 40b and a public save area 50b, along with an OS 70b. Of course additional components may be present in second partition 20b. In some implementations a given partition need not include any dedicated cores. That is, a given partition may include minimal hardware functionality and may rely on shared resources to perform various processing activities.

System 10 may further include a management partition 20c to assist with the management of sharing relationships within system 10. While shown as a separate partition in the embodiment of FIG. 1, it is to be understood the scope of the present invention is not limited in this regard, and in other implementations sharing management may be effected without a dedicated partition. Further, management partition 20c may be realized solely in hardware for some embodiments and may not be present as a partition. As shown in the embodiment of FIG. 1, management partition 20c includes a management interface 40c. Furthermore, private save areas 55 and 60 may be present to enable storage of state information of core 30a for each of first partition 20a and second partition 20b.

For ease of illustration FIG. 1 shows that first partition 20a is an owning partition and second partition 20b is a leasing partition. However, in many implementations a partition may act as both an owning partition and a leasing partition. That is, where multiple cores are allocated to such partitions, the partitions can choose to allow one or more cores allocated to it to be shareable cores. Accordingly, sharing interfaces 40a and 40b may act as both granting and leasing interfaces. To effect these operations, the interface may be formed of hardware, firmware, software, or combinations thereof. Of course in other implementations, separate interfaces may be present for granting and leasing activities.

For purposes of further discussion herein, assume that system 10 is arranged such that first partition 20a is an owning partition having at least one shareable resource to be shared with second partition 20b, which may be a leasing partition to share the resource as allowed by first partition 20a. Accordingly, in the discussion that follows sharing interface 40a may be referred to as a granting interface, while sharing interface 40b may be referred to as a leasing interface.

At a high level in operation, system 10 may execute an initialization phase in which cores and other resources are allocated to the different partitions. In this allocation phase, the partitions may further indicate whether one or more such resources can be considered shared resources. Generally this allocation phase will set various indicators and relationships (e.g., contracts) within management partition 20c, which may provide assistance between owning and leasing partitions.

At the conclusion of such initialization, normal operation may begin and, upon a given stimulus by an owning partition by use of granting interface 40a, shareable resources may be made available for use in a leasing partition. The leasing partition may take full advantage of the resource until the owning partition signals that it again seeks use of the resource. Specific implementations of such methods are described further below.

Figure 2:
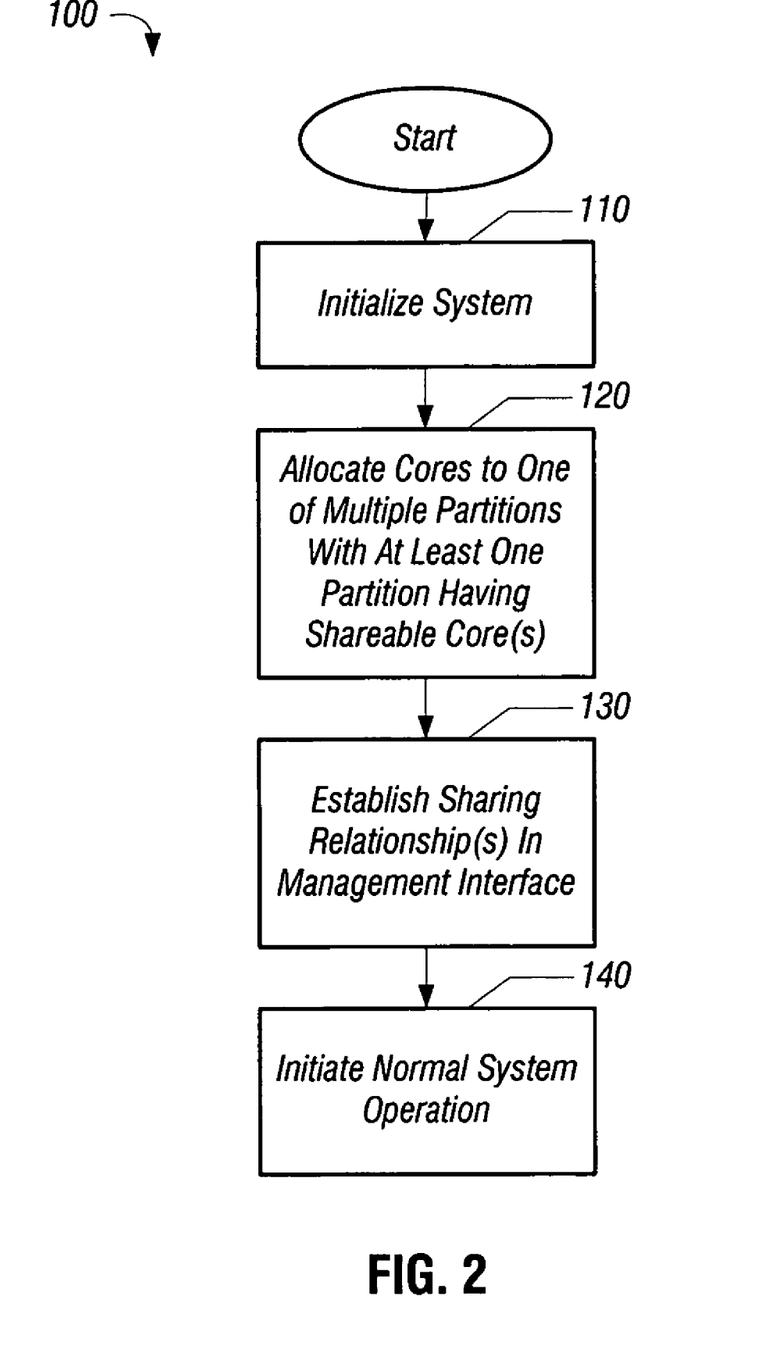
FIG. 2 is a flow diagram of a method in accordance with one embodiment of the present invention.

Referring now to FIG. 2, shown is a flow diagram of a method in accordance with one embodiment of the present invention. As shown in FIG. 2, method 100 may be used to set up a system in a partitioned manner and further to enable sharing of resources between partitions. As shown in FIG. 2, method 100 may begin by initializing a system (block 110). For example, such initialization may occur on power up of a system to effect the running of various low-level software such as self-test mechanisms, basic input/output system (BIOS) and other such software to identify and initialize various hardware components of the system.

Next, cores of the system may be allocated to one of multiple partitions (block 120). Furthermore, at least one of the partitions may have one or more shareable cores or other resources. The following discussion is with respect to processor cores, although the scope invention is not limited in this regard. Partitioning the system into multiple partitions may occur in various manners. Furthermore, the decision of a partition to allow one or more of its resources to be shareable may be based on various factors. For example, the owning partition via an OS or driver or application software can determine at some time during normal operation that it has less computation required for a future time period and is able to release a core to be better utilized by another partition. Such an owning partition may monitor its utilization of cores and determine that the current workload can be satisfied with one less core. To identify the shareable cores, the owning partition may set various indicators within granting interface 40a of the owning partition to indicate that it is willing to lease use of one or more cores. For example, the interface may include a table having an entry for each of its cores with an identifier to identify the core as a dedicated or shareable core, and an indicator that can be set to indicate when a shareable core is available for sharing. Alternatively, a special instruction may be executed to indicate that a core can be shared.

Referring still to FIG. 2, control then passes to block 130. There, sharing relationships between the various partitions may be established in a management interface (block 130). In the context of a basic system including an owning partition and a leasing partition, the sharing relationship may correspond to a pre-arranged leasing contract to identify the owning partition and one more cores to be shared. The leasing contract further identifies the leasing partition that is to use the shareable resources when available. Sharing relationships may be on various levels. For example, partitions may share on a 1:1 basis, or an owning partition may make a core available to multiple leasing partitions. As one example, a resource table or similar structure within management partition 20c may act as a pool to list shareable resources that can be used by various leasing partitions. In such implementations, when a core is made available for sharing, an indication may be made in the table and a waiting leasing partition may obtain use of the core. The owning partition may or may not be aware of the specific partition that will lease a core.

After establishing such pre-arranged relationships, normal system operation may be initiated (block 140). During normal operation, the various partitions may execute instructions according to an OS or other software of the partition. When cores are made available for sharing, the leasing partition may take advantage of the resources to improve its processing capabilities, at least while it has access to such resources. In alternate embodiments, this step may be performed between blocks 120 and 130. Such an embodiment would allow establishing the sharing relationships during normal operation. Example mechanisms for enabling such sharing and performing the sharing will be discussed further below.

Figure 3:
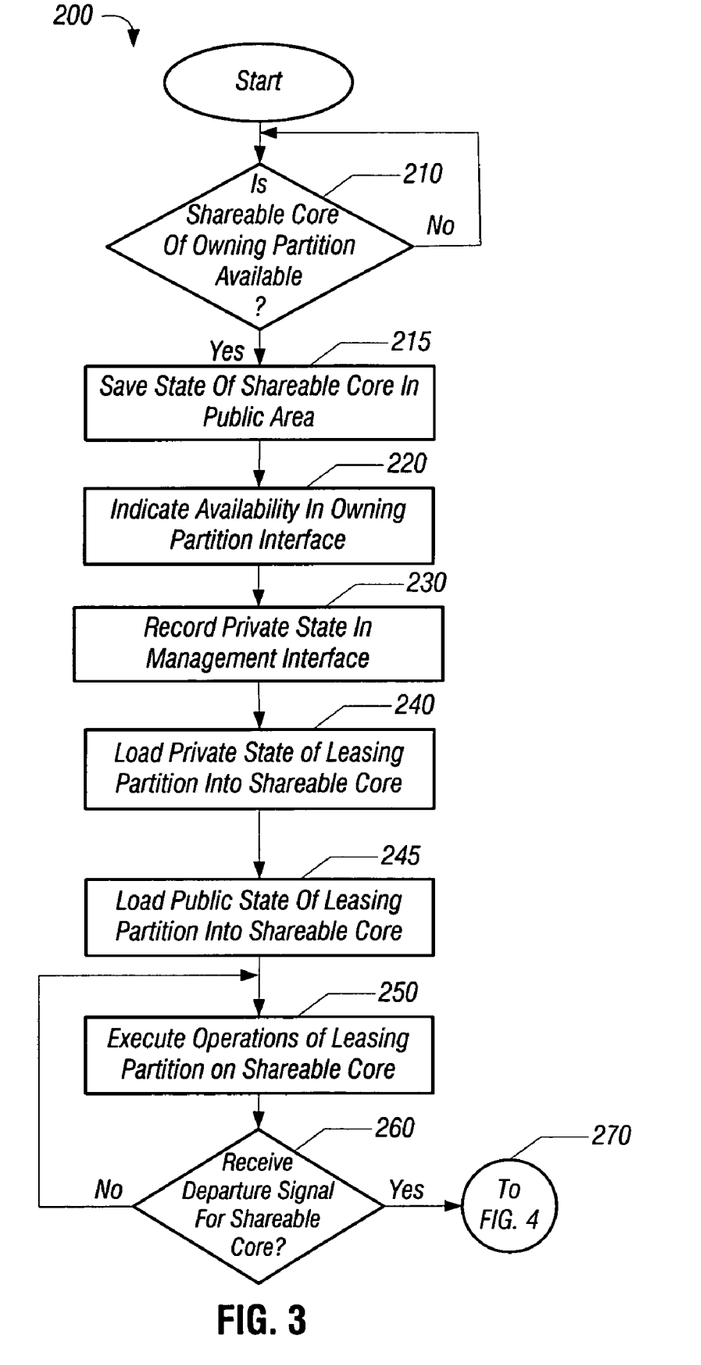
FIG. 3 is a flow diagram of a method of leasing a resource in accordance with an embodiment of the present invention.

Referring now to FIG. 3, shown is a flow diagram of a method of leasing a resource in accordance with an embodiment of the present invention. As shown in FIG. 3, method 200 may begin by determining whether a shareable core of an owning partition is available (diamond 210). For example, the owning partition may not be fully utilizing its processing resources, e.g., because it is not executing a computation-intensive application or for another such reason. If it is determined that the owning resource has one or more shareable cores available, control passes to block 215. Otherwise, diamond 210 loops back on itself.

At block 215, which may be performed prior to a time that the owning partition indicates availability of the shareable core, the owning partition may store the current public state of the shareable core (e.g., register files, control registers and the like) so that it may later return to the owning partition with the same state at which the core left. This public state may be stored in a storage associated with the owning partition. Control then passes to block 220. At block 220, the owning partition may indicate availability of the shareable resource (e.g., core) in the owning partition interface. For example, as described above an indicator in an entry of the owning partition granting interface 40a may be set to indicate the core availability. Furthermore leasing interface 40b of the leasing partition may be set to indicate availability of the core (not shown in FIG. 3). This interface may thus generate an interrupt to be handled by the leasing partition to indicate the availability and begin the core initialization process for the shareable core, discussed below. Alternatively, the leased core may simply begin execution at a well-defined location, described further below, and no interrupt may be generated. To maintain a current private state of the shareable resource prior to the time that it is shared, the private state of the shareable core may be recorded in the management interface (block 230). The saving of the public core state and the indication of a core available to lease may be done as one indivisible step in some embodiments. In any case, the saving of the public and private core state is completed before the core is made available to the leasing partition.

Still referring to FIG. 3, next the private state of the leasing partition may be loaded into the shareable core (block 240). This private state may be private state information stored in the management interface. Then control passes to block 245, where a public state of the leasing partition may be loaded into the shareable core. The public state in the leasing partition may be loaded based on an indication from an interface of the leasing partition of the core's availability. This interface may thus inform the partition's OS of the arrival of a leased core (and a subsequent departure of the core). This public state information is visible to the leasing partition, and may be present in a storage of the leasing partition. Such public state information may be a state of the leasing partition when a prior shareable core (the same core or a different core) was previously used by the leasing partition. In this manner, the shareable core is readied for execution in the leasing partition.

Note that as part of the initialization of the leasing partition, it may establish an initial state for any future leased cores it is willing to lease. Alternatively, an interrupt could be generated the first time an additional leased core is made available to allow the leasing partition to establish an initial state for the public area of a leased core.

Control passes next to block 250, where the shareable core may execute operations of the leasing partition (block 250). For example, in one embodiment the leasing partition may check its own leasing interface 40b to determine the arrival of a core and program an instruction pointer of the shareable core via the interface for it to begin execution. In many implementations, an OS of the leasing partition may carefully select operations to perform on the shareable core. That is, because the OS cannot assume that it will retain use of the shareable core for any specific period of time, certain tasks may be more appropriate for the shareable core than others. For example, OS-based tasks that require acquiring OS internal synchronization locks may not be suitable for the shareable core. In contrast, computation-intensive operations, e.g., of an application, may be appropriate for execution on the shareable core. Note that in some implementations, there may be restrictions on the functionality of shareable cores. For example, a shared core may not be the target of a message signaled interrupt, e.g., from an I/O device in the leasing partition. However, the shareable core may be a target of an I/O device when in the owning partition.

Still referring to FIG. 3, while executing operations of the leasing partition, it may be determined whether a departure signal is received for the shareable core (diamond 260). Such a departure signal may be a command from the owning partition that it seeks to transition back use of the shareable core. That is, the owning partition may dynamically instruct return of the shareable core. In one embodiment, the leasing partition may receive an interrupt which, when handled, causes the shareable core to transition back to the owning partition. Alternatively, the signal may cause no explicit event visible to the leasing partition when the core is returned to the owning partition. An advisory indication may be made via leasing interface 40b, but the leasing partition may have no ability to take immediate action when the leased core is returned. Such a process is discussed further with regard to FIG. 4 (circle 270). If no such departure signal is received at diamond 260, control passes back to block 250 for further execution using the shareable resource. While described with this particular implementation in the embodiment of FIG. 3, it is to be understood that the scope of the present invention is not limited in this regard.

Figure 4:
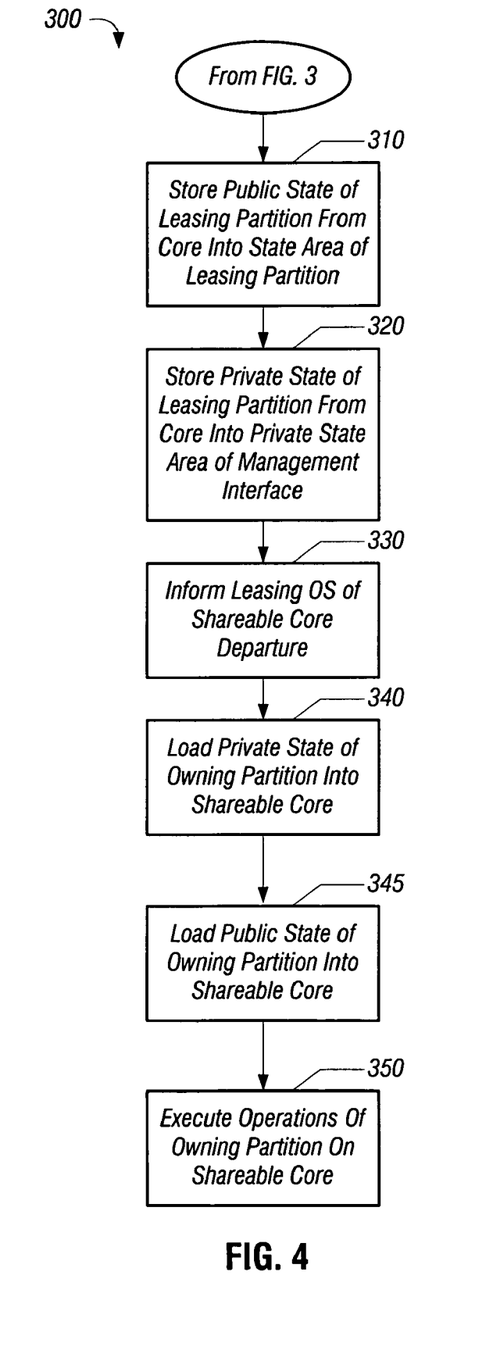
FIG. 4 is a flow diagram of a method of transitioning a shareable core back to an owning partition in accordance with an embodiment of the present invention.

Referring now to FIG. 4, shown is a flow diagram of transitioning a shareable core back to an owning partition in accordance with an embodiment of the present invention. As shown in FIG. 4, method 300 may begin by storing public state information of the leasing partition from the core into the state area of the leasing partition (block 310). This public state of the shareable core may be stored in a location of a leasing partition that is visible and accessible to the leasing partition. Accordingly, when a future shareable core is leased by the leasing partition, this state may be provided to the new shareable core to enable it to undertake processing with the prior state of the previous shareable core.

Similarly, a private state of the leasing partition may be stored from the core into a private state area of the management interface (block 320). For example a label of the shareable core indicating its use by the leasing partition may be stored, along with other private information such as core state information that may not be normally visible to an OS. This private information may include, for example, partitioning barrier control settings or other internal implementation state of the core. By use of the public and private store areas, the management partition may manipulate the state of the core, e.g., switching between partitions so that it may be determined what operations the core was performing when it departed a given partition and setting a desired initial state of the core on arrival to a given partition. The OS in each partition may have total control and usage of a core via its public state while a core is allocated to a specific partition.

Referring still to FIG. 4, next the leasing OS may be informed of the shareable core's departure (block 330). For example, leasing interface 40b of the leasing partition may have an indicator set to inform the OS of the departure of the leased core and an interrupt may be generated so another core in the leasing partition can allow the OS to react to the leased core's departure. Next, the private state of the owning partition may be loaded into the shareable core (block 340). For example, a private state of the owning partition present in the management interface may be loaded into the core. Then, at block 345 a public state of the owning partition may be loaded into the shareable core. For example, public state information previously stored in an area of the owning partition prior to a release of the shareable core may be re-loaded. In some embodiments, the private save areas are only visible and accessible by the management partition to assist in the transition of a core from one partition to another, while the public save areas are visible to the OS or other software running in their respective partition. This ensures that state in each partition remains isolated from other partitions even though a core is transitioning between partitions due to a lease. In this way, the desired initial state for resumption by the shareable core for execution of the owning partition may be implemented. Accordingly, the shareable core may execute operations of the owning partition (block 350). While described with this particular implementation in the embodiment of FIG. 4, other manners of transitioning a shareable core from a leasing partition to an owning partition may be realized. For example, in some implementations multiple cores may be shared. To effect this, various indicators or identifiers to indicate which cores are to be shared and amongst which partitions may be present, e.g., in the management interface.

Accordingly, various embodiments allow cores in a partitioned system to be owned by independent partitions, but more effectively used when a given partition does not require a core for some (e.g., temporary, unpredictable) period of time. Furthermore, embodiments may implement such sharing without centralized hardware or software to determine transitioning of cores. Instead, an owning partition itself can independently, explicitly, and asymmetrically identify resources and time frames at which they are available for sharing. In this way, cores may be dynamically transitioned into and out of partitions during execution, such as during execution of a single application. In this way, different classes of service may be provided such that the owning partition may have a higher class of service when all of its shareable cores are present for use. However, for given time periods in which such higher class of service is not needed, one or more shareable cores may be available for use by other partitions. Furthermore, the transitioning of cores into and out of partitions is explicitly visible, both to the owning partition as well as the leasing partition. Note that the transitioning of a core does not allow one partition to inappropriately gain access to information in another partition. The isolation of partitions is still preserved while allowing cores to be leased. The computations in different partitions can be mutually suspicious and still safely gain the advantage of leased cores. In various implementations, frequent transitions may occur to enable higher service levels by using additional processing resources when available and moving such processing resources away from partitions that, at least for a certain time, do not need the resources.

Figure 5:
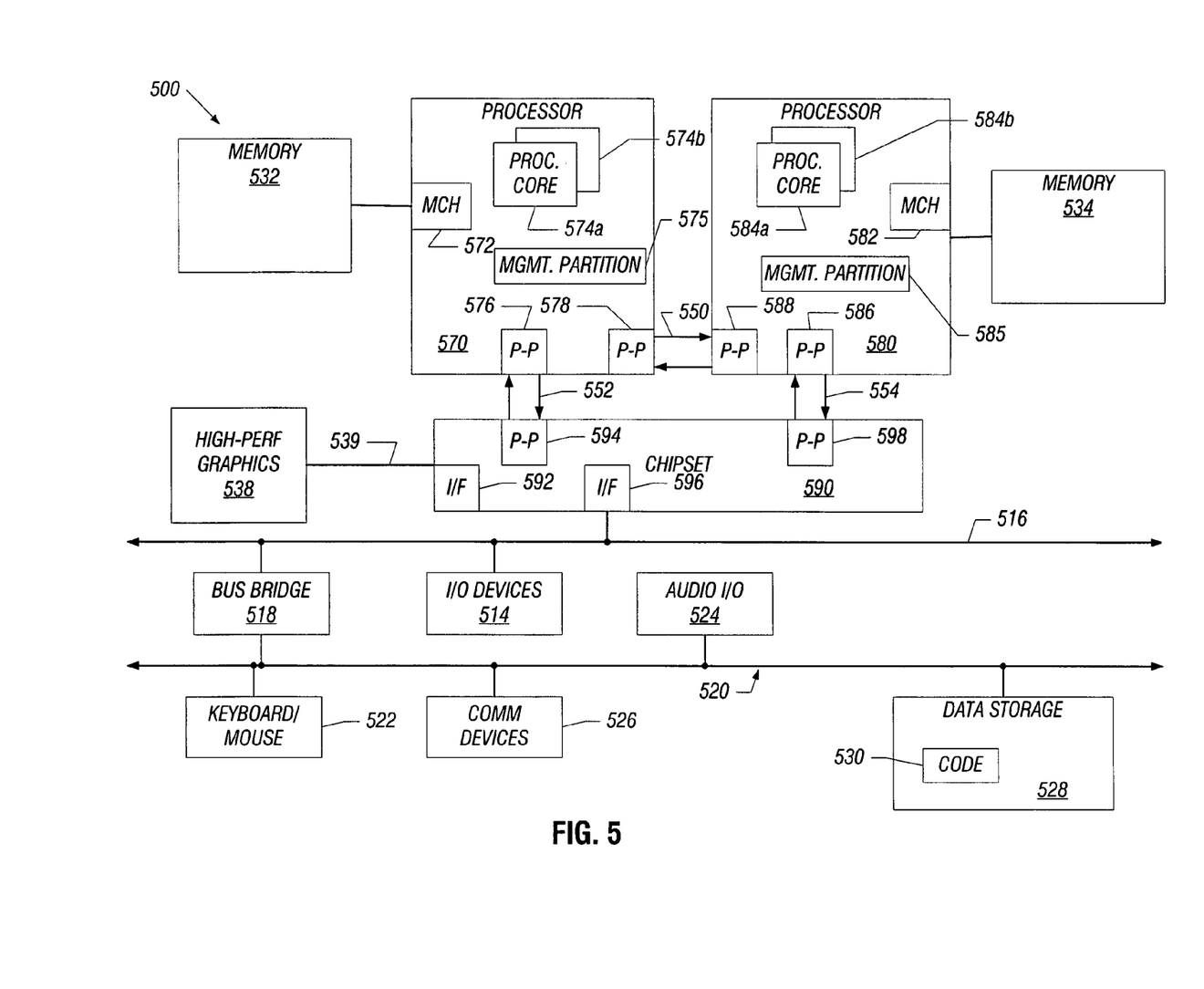
FIG. 5 is a block diagram of a multiprocessor system in accordance with an embodiment of the present invention.

Embodiments may be implemented in many different system types. Referring now to FIG. 5, shown is a block diagram of a multiprocessor system in accordance with an embodiment of the present invention. As shown in FIG. 5, multiprocessor system 500 is a point-to-point interconnect system, and includes a first processor 570 and a second processor 580 coupled via a point-to-point interconnect 550. However, in other embodiments the system may be of another bus architecture, such as a multi-drop bus or another such implementation. As shown in FIG. 5, each of processors 570 and 580 may be multi-core or many-core processors including first and second processor cores (i.e., processor cores 574a and 574b and processor cores 584a and 584b) although other cores and potentially many more other cores may be present in particular embodiments. Processors 570 and 580 may each have multiple partitions. Alternately, each processor may correspond to a partition. Each of processors 570 and 580 may further include a management partition 575 and 585 which may be dedicated cores of its associated processor in one embodiment. In various implementations, management partitions 575 and 585 may be used in sharing of cores between owning and leasing partitions, as described above.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 5, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as the PCI Express bus or another third generation input/output (I/O) interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    allocating at least one dedicated core and at least one shareable core to a first partition of a multiprocessor system that is soft partitioned, wherein the at least one dedicated core and the at least one shareable core are owned by the first partition, and allocating the at least one shareable core includes identifying the at least one shareable core in a management interface of a management partition corresponding to another dedicated core coupled to the first partition and a second partition of the multiprocessor system;
    storing a public state of the first partition in a storage of the first partition;
    storing a private state of the first partition in a first save area of the management interface, the private state of the first partition including core state information not visible to an operating system (OS) of the first partition;
    loading a private state of the second partition stored in a second save area of the management interface into the at least one shareable core during a leasing of the at least one shareable core to the second partition, the private state of the second partition including core state information not visible to an operating system (OS) of the second partition;
    loading a public state of the second partition stored in the second partition into the at least one shareable core during the leasing; and
    dynamically using the at least one shareable core in the second partition of the system.

2. The method of claim 1, further comprising establishing a sharing relationship between the first partition and the second partition with respect to the at least one shareable core according to an asymmetric contract in which the first partition retains control over the at least one shareable core and can rescind sharing of the at least one shareable core by the second partition.

3. The method of claim 1, further comprising indicating arrival or departure of the at least one shareable core in an interface of the first partition and in an interface of the second partition.

4. The method of claim 1, further comprising dynamically instructing, by the first partition, return of the at least one shareable core from the second partition back to the first partition during execution of a process on the second partition.

5. An apparatus comprising:
    a first partition having ownership of a plurality of cores, wherein at least one core of the plurality of cores is a dedicated core of the first partition and at least one other core of the plurality of cores is a leasable core usable by the first partition or a second partition, wherein the first partition includes a storage to store visible state information of the leasable core if the leasable core is made available for use by the second partition; and
    an interface of a management partition implemented on a dedicated core coupled to the first partition and the second partition to store private state information including core state information of the leasable core for the first partition if the leasable core is made available for use by the second partition before the leasable core is made available for use by the second partition, the private state information of the leasable core not visible to operating systems of the first partition or the second partition.

6. The apparatus of claim 5, further comprising a storage in the interface to store contractual information regarding sharing relationships of the leasable core, wherein the contractual information is asymmetric such that the first partition retains control over the leasable core and can rescind sharing of the at least one leasable core by the second partition.

7. The apparatus of claim 5, further comprising a first interface of the first partition, wherein the first interface is to indicate availability of the leasable core for use by the second partition.

8. The apparatus of claim 7, further comprising a second interface of the second partition, wherein the second interface is to indicate arrival or departure of the leasable core from the second partition.

9. The apparatus of claim 5, wherein the first partition is to control availability of the leasable core by the second partition.

10. The apparatus of claim 5, wherein the leasable core is to be dynamically returned from the second partition, responsive to a dynamic instruction of the first partition, to the first partition during execution of a process on the second partition.

11. A system comprising:
    a plurality of processors to be partitioned according to soft partitioning, wherein the system further includes:
    a first partition including a first dedicated core, a first shareable core, and a first interface to indicate availability of the first shareable core if the first shareable core is made available for sharing, wherein the first partition includes a first storage to store a public state of the first shareable core with respect to the first partition if the first shareable core is made available for sharing;
    a second partition including a second interface to indicate availability of the first shareable core for use by the second partition if the first shareable core is made available for sharing;
    a controller including a dedicated core and coupled to the first partition and the second partition, the controller to store in first and second save areas of a storage of the controller private state of the first shareable core with respect to the first partition and the second partition, the private state with respect to the first partition including core state information not visible to an operating system (OS) of the first partition and the private state with respect to the second partition including core state information not visible to an OS of the second partition, wherein the private state with respect to the first partition to be stored in the first save area during a first leasing operation and the private state with respect to the second partition to be stored in the second save area during a second leasing operation; and a dynamic random access memory (DRAM) coupled to the first partition and the second partition.

12. The system of claim 11, wherein the first partition is to control the availability of the first shareable core for sharing, wherein the first partition is owner of the first shareable core.

13. The system of claim 11, wherein the controller is to store a sharing relationship between the first partition and the second partition with respect to the first shareable core, the sharing relationship identified by an asymmetric contract in which the first partition retains control over the first shareable core.

14. The system of claim 11, wherein the first shareable core is to reload the public state of the first shareable core and the private state of the first shareable core with respect to the first partition on return of the first shareable core to the first partition.

* * * * *